(12) United States Patent
Chang

(10) Patent No.: US 9,248,479 B2
(45) Date of Patent: Feb. 2, 2016

(54) CLEANING DEVICE FOR CLEANING OPTICAL LENSES IN TRAY

(71) Applicant: Chia-Chun Chang, New Taipei (TW)

(72) Inventor: Chia-Chun Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 500 days.

(21) Appl. No.: 13/663,385

(22) Filed: Oct. 29, 2012

(65) Prior Publication Data

US 2013/0167314 A1 Jul. 4, 2013

(30) Foreign Application Priority Data

Dec. 30, 2011 (TW) .............................. 100149809 A

(51) Int. Cl.
*B60S 1/02* (2006.01)
*B08B 11/02* (2006.01)
*G02B 27/00* (2006.01)
*B03C 1/033* (2006.01)
*B03C 1/06* (2006.01)

(52) U.S. Cl.
CPC ............... *B08B 11/02* (2013.01); *B03C 1/0332* (2013.01); *B03C 1/06* (2013.01); *B60S 1/02* (2013.01); *G02B 27/0006* (2013.01)

(58) Field of Classification Search
CPC ................................ A47L 13/40; B08B 1/008
USPC ....................................... 15/104.001, 250.001
See application file for complete search history.

(56) References Cited

U.S. PATENT DOCUMENTS 5,005,248 A * 4/1991 Bonar ........................ 15/250.04
5,868,258 A * 2/1999 Hubbard, Jr. ................. 209/215

FOREIGN PATENT DOCUMENTS

CN 101143365 B 3/2011

* cited by examiner

*Primary Examiner* — Monica Carter
*Assistant Examiner* — Stephanie Berry
(74) *Attorney, Agent, or Firm* — Novak Druce Connolly Bove + Quigg LLP

(57) ABSTRACT

Provided is a cleaning device for cleaning optical lenses positioned in a tray. The cleaning device includes a supporting base for supporting the tray, two sliding members, a connecting plate, and a magnetic member. The supporting base includes a bottom plate and two parallel rails formed on a surface of the bottom plate. The sliding members are spatially corresponding to the rails, and each sliding member is slidably mounted on a corresponding one of the rails. The connecting plate is fixedly supported on the sliding members. The magnetic member is attached on a surface of the connecting plate facing toward the bottom plate.

9 Claims, 3 Drawing Sheets

CLEANING DEVICE FOR CLEANING OPTICAL LENSES IN TRAY

BACKGROUND

1. Technical Field

The present disclosure relates to cleaning devices, and particularly, relates to a cleaning device for cleaning optical lenses held in a tray.

2. Description of Related Art

Optical lenses are the main optical elements in a lens module and can be made of plastic by injection molding. When optical lenses are molded, the optical lenses are held in a tray for transportation. However, during the displacement of the transportation, the lenses may be stained by iron pollutant, which may decrease optical quality of the optical lenses.

What is needed therefore is a cleaning device addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
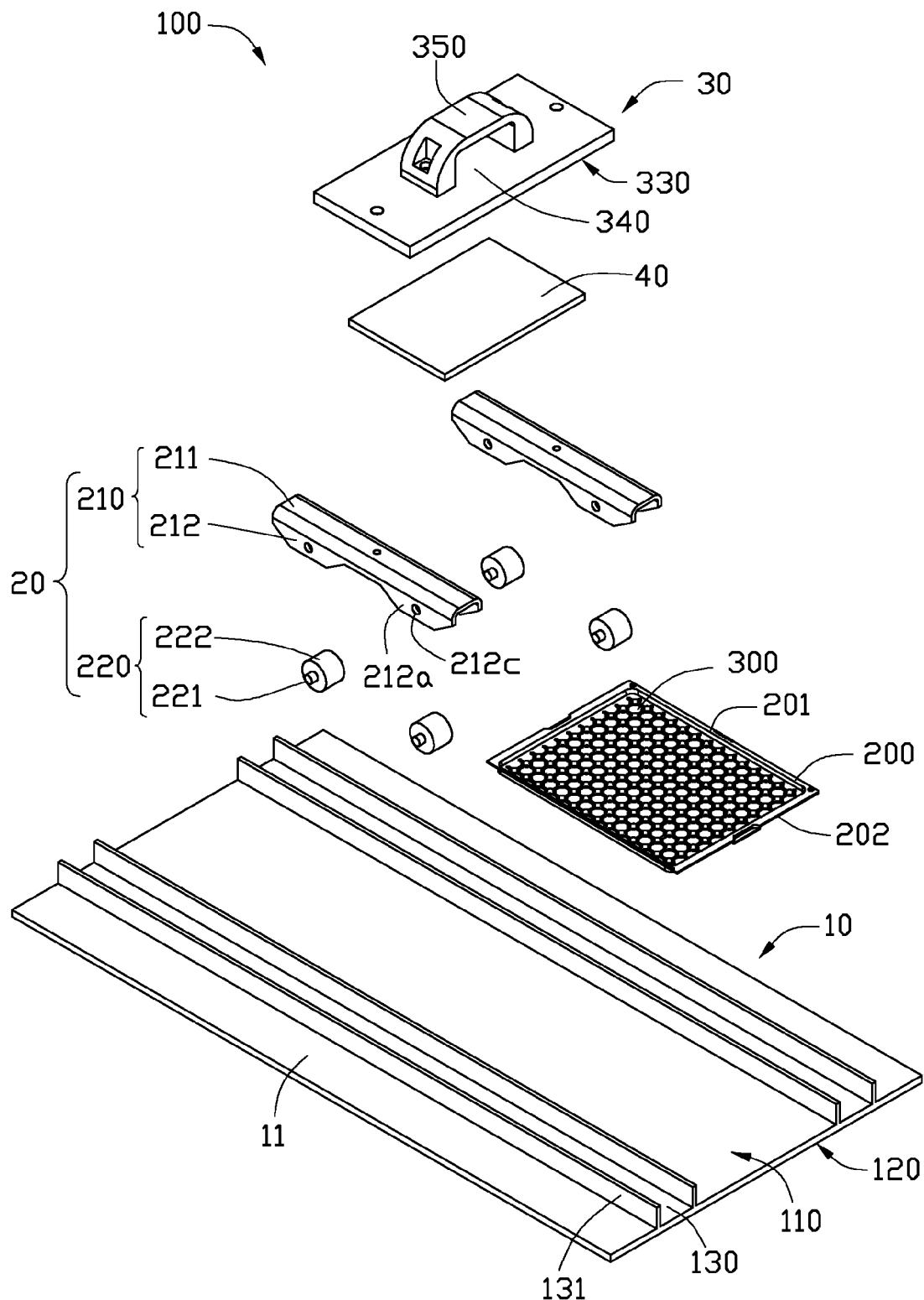
FIG. 1 is an isometric exploded schematic view of a cleaning device for cleaning optical lenses in a tray, according to an exemplary embodiment of the present disclosure.
Figure 2:
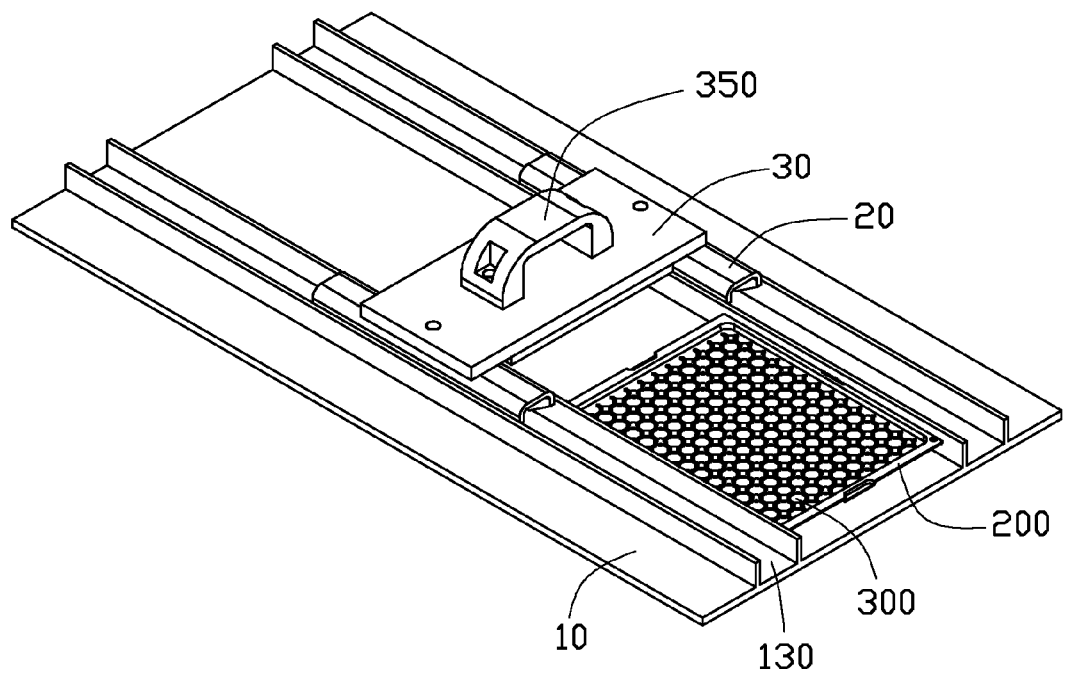
FIG. 2 is an isometric schematic view of the cleaning device of FIG. 1.

Referring to FIGS. 1-2, a cleaning device 100, according to an exemplary embodiment, is shown. The cleaning device 100 is configured for cleaning optical lenses 300 positioned in a tray 200. A shape and size of the tray 200 are not limited to this embodiment and can be designed according to different demands. In this embodiment, the tray 200 is substantially rectangular, and includes two parallel first side bars 201 and two parallel second side bars 202. The first side bars 201 are substantially perpendicular to the second side bars 202.

The cleaning device 100 includes a supporting base 10, two sliding members 20, a connecting plate 30, and a magnetic member 40.

The supporting base 10 is configured for supporting the tray 200. The supporting base 10 includes a bottom plate 11 and two rails 130 substantially parallel to each other. The bottom plate 11 is substantially rectangular. The bottom plate 11 includes a first surface 110 and a second surface 120 opposite to the first surface 110. The rails 130 are spatially corresponding to the sliding members 20. The rails 130 are formed on the first surface 110 of the bottom plate 11. Each rail 130 includes two parallel guiding strips 131. In this embodiment, the rails 130 are integrated with the bottom plate 11. The tray 200 is accommodated between the rails 130. In this embodiment, the perpendicular distance between the rails 130 is larger than a length of each first side bar 201 or a length of each second side bar 202.

Each sliding member 20 is slidably connected to a corresponding rail 130. Each sliding member 20 includes a connecting member 210 and two wheels 220 rotatably connected to the connecting member 210. The connecting member 210 includes a top plate 211 and two side plates 212 substantially perpendicular to the top plate 211. Each side plate 212 includes two protruded connecting portions 212a each for connecting to a corresponding wheel 220. Each connecting portion 212a of one of the side plates 212 is aligned with a corresponding connection portion 212a of the other of the side plates 212. Each connecting portion 212a defines a shaft hole 212c. The shaft hole 212c in each side plate 212 is aligned with the shaft hole 212c on corresponding side plate 212. Each wheel 220 includes a wheel body 222 and a shaft 221 connected to the wheel body 222. A length of the wheel body 222 along a central axis thereof is less than a perpendicular distance between the side plates 212. A length of the shaft 222 along the central axis is substantially equal to the perpendicular distance between the side plates 212. The shaft 221 passes through the wheel body 222 and is fixedly connected the wheel body 222 by an interference fit manner. Two opposite ends of the shaft 221 respectively protrude from two opposite end surfaces of the wheel body 222. The two opposite ends of the shaft 211 respectively insert into a pair of aligned shaft holes 212c.

A perpendicular distance of outer surfaces of the side plates 212 of each sliding member 20 is slightly less than a perpendicular distance of inner surfaces of the guiding strips 131 of each rail 130, thus the sliding member 20 can be fittedly and slidably mounted between the strips 131. The strips 131 restrict the sliding member 20 to slide along the rail 130.

In this embodiment, each connecting member 210 connects to two wheels 220, and the number of the connecting portions 212a of each side plate 212 is two. It should be understood that the number of the wheels and the connecting portions can be changed according to different demands.

The connecting plate 30 is supported on the sliding members 20. The connecting plate 30 includes a third surface 330 facing toward the first surface 110 of the bottom plate 11 and a fourth surface 340 opposite to the third surface 330. The connecting plate 30 further includes a handle 350 formed on the fourth surface 330. A force can acted on the handle 350 to move the connecting plate 30. Two opposite ends of the connecting plate 30 are fixedly connected to the sliding member 20, respectively.

The magnetic member 40 is fixedly attached on the third surface 330 of the connecting plate 30. In this embodiment, the magnetic member 40 is substantially rectangular. A length of the magnetic member 40 along a direction perpendicular to the rails 130 and parallel to the bottom plate 11 is slightly less than the distance between the rails 130. In this embodiment, the magnetic member 40 is a piece of magnet.

Figure 3:
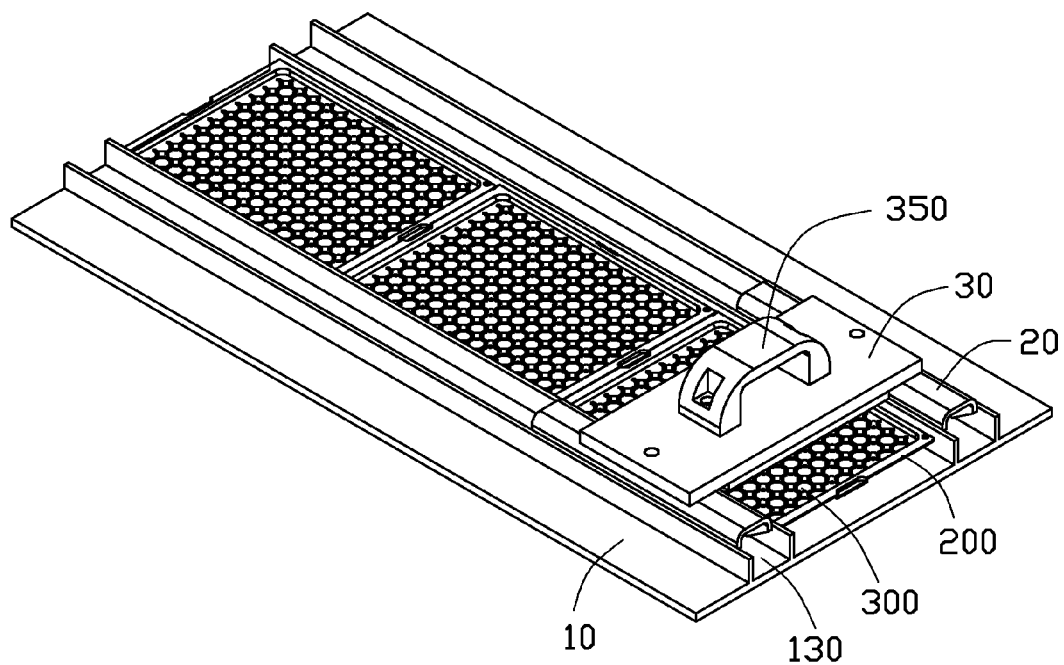
FIG. 3 is similar to FIG. 2, but showing the cleaning device in use.

Referring also to FIG. 3, in operation, a number of trays 200 with optical lenses 300 are positioned between the rails 130. The connecting plate 30 can be moved over the trays 200 along the rails 130, during the movement of the connecting plate 30, the magnetic member 40 is driven to move over the trays, thus iron filings on the trays 200 can be drawn to the magnetic member 40 under a magnetic force therebetween. Therefore, the cleaning device 100 can clean the optical lenses 300 in the trays 200 to prevent the optical lenses 300 from being polluted by iron pollutant.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A cleaning device for cleaning optical lenses positioned in a tray, comprising:

a supporting base for supporting the tray, the supporting base comprising a bottom plate and two parallel rails on a surface of the bottom plate;

two sliding members spatially corresponding to the rails respectively, each sliding member being slidably mounted on a corresponding one of the rails;

a connecting plate fixedly supported on the sliding members; and a magnetic member attached on a surface of the connecting plate and facing toward the bottom plate.

2. The cleaning device of claim 1, wherein each rail comprises two parallel guiding strips, and the two parallel guiding strips cooperatively restrict a corresponding one of the sliding members therein.

3. The cleaning device of claim 2, wherein the rails are integrated with the bottom plate.

4. The cleaning device of claim 3, wherein each sliding member comprises a connecting member and two wheels rotatably connected to the connecting member, and the two wheels are rotatably mounted on the two parallel guiding strips of the respective rail.

5. The cleaning device of claim 4, wherein the connecting member comprises a top plate and two side plates substantially perpendicular to the top plate, each side plate comprises two protruded connecting portions, each connecting portion of one of the side plates is aligned with a corresponding connection portion of the other of the side plates, and each wheel is rotatably mounted on two aligned connecting portions.

6. The cleaning device of claim 5, wherein each connecting portion defines a shaft hole, the shaft hole in each side plate is aligned with the shaft hole in a corresponding side plate; each wheel comprises a wheel body and a shaft connected to the wheel body, the shaft passes through the wheel body and is fixed connected to the wheel body, two opposite ends of the shaft respectively protrude from two opposite end surfaces of the wheel body, the two opposite ends of the shaft respectively insert into a pair of aligned shaft holes.

7. The cleaning device of claim 6, wherein the shaft is fixed connected to the wheel body by an interference fit manner.

8. The cleaning device of claim 1, wherein the connecting plate comprises a handle on a top surface thereof.

9. The cleaning device of claim 1, wherein the magnetic member is a piece of magnet.

* * * * *